Figure 1:
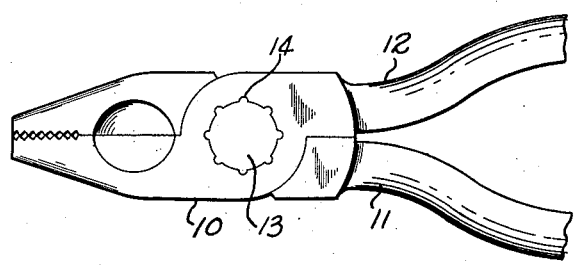

May 18, 1948. W. A. BARNES 2,441,552
OIL RESERVOIR
Filed Nov. 27, 1944

INVENTOR.
William A. Barnes
BY
Stoddling and Krost
attys.

Patented May 18, 1948

2,441,552

UNITED STATES PATENT OFFICE 2,441,552

OIL RESERVOIR

William A. Barnes, Utica, N. Y., assignor to Utica Drop Forge & Tool Corporation, a corporation of New York Application November 27, 1944, Serial No. 565,381

4 Claims. (Cl. 287—101)

My invention relates to bearing surfaces in general, and more particularly to pivotal joints of hand tools.

With hand tools such as pliers, side cutters, tin snips, scissors, and like tools employing a pivotal connection, it has been a problem of long standing to prevent excessive wear in the pivot area and on the pivot itself, in these tools. It can readily be understood, of course, that applying oil to bearing surfaces of this type by means of an external applicator is entirely unsatisfactory and ineffective, because the oil usually does not penetrate to the far interior surfaces where it is most needed. Attempts have been made to provide various strain relieving devices to reduce the amount of wear placed directly upon the rivet or pivot member of these tools, but at best this method provides only an enlarged bearing surface and thus extends the life of the tool by providing more surface to wear away. Another attempt employed to reduce the amount of wear was to provide recesses in the pivot area, and fill these recesses with a felt pad or similar adsorbent material of fibrous nature. These pads are soaked in oil to allow the oil to permeate the pad to serve as an oil reservoir. However, it will be readily apparent that these pads are limited to a joint employing a screw type pivotal connection. In many instances, a screw type connection is undesirable, and the tool is assembled and riveted in the unhardened condition and then subjected to high temperatures for heat treating and hardening of the parts. It is obvious that the fibrous pads could not withstand this heat treatment, and therefore cannot be applied to rivet type pivotal members. Further, these pads do not exclude air and moisture from the oil and thus the weather conditions under which many of these tools are subjected, causes a rapid decomposition of the oil and renders these reservoirs ineffective in a short period of time.

Therefore, an object of my invention is to provide an oil reservoir for a riveted pivotal member which can withstand high temperatures without deterioration.

Another object of my invention is to provide a combined guide member and interlocking member to serve as a bearing between the two pivotal parts of a hand tool, and which will also serve as an oil reservoir to lubricate the entire bearing area.

Another object of my invention is to provide an oil reservoir which may be filled with oil by heating the reservoir to expand gases contained in the pores of the reservoir, and cooling the reservoir in a bath of oil to contract the gases within the pores of the reservoir and draw oil deep into the pores.

Another object of my invention is to provide an oil reservoir for a hand tool comprising two pivoted members, said reservoir dispersing oil to the pivot area of the tool through capillary action only, and resisting dispersion of the oil contained within the reservoir by physical shock.

Another object of my invention is to provide an oil reservoir for a hand tool employing relatively movable parts pivoted together in a pivot area, said reservoir holding a supply of oil and effectively blocking the entrance of water or moisture into the pores of the reservoir to prevent rusting of the reservoir and decomposition of the oil.

Another object of my invention is to provide a porous metal oil reservoir for the pivot area of a pivoted hand tool with parts of the reservoir in contact with the bearing surfaces of the pivot area and with the pivot member or rivet of the tool to provide lubrication therefor.

Another object of my invention is to provide a method for filling the interstitial pores of a porous metal oil reservoir.

Other objects and a fuller understanding of my invention may be had by referring to the following specification and claims, together with the accompanying drawing:

Figure 1 is a side plan view of a pair of hand pliers which may be equipped with my improved oil reservoir and is shown with the handles thereof broken away;

Figures 2, 3, 4 and 5 as well as 6 and 7, are cross-sectional views through the pivot area of the tool of Figure 1, and illustrate various types of oil rings and guide members which may be used with the tool of Figure 1.

Referring now to the Figure 1 of the drawing, I illustrate a type of tool, namely a plier tool, which may employ my improved oil reservoir either solely as an oil reservoir or as a combined oil reservoir and bearing member. The plier tool 10 comprises two lever members 11 and 12 pivoted together by a rivet member 13. The lever member 12 is illustrated as having a series of grooves 14 impressed into the counter-sunk hole that receives the rivet 13 and the rivet end is shown deep down into the groove 14 so that the end of the rivet is fixed solidly in that plier half. The other plier half 11 then revolves on the rivet. It will be seen from the Figure 1, that the two levers 11 and 12 fit closely together and provide a very difficult path for oil to enter from the out-side and penetrate into the bearing surface between the two levers 11 and 12, and the bearing surface between the rivet 13 and the lever 11.

My invention embodies the general principle of providing a porous metal oil reservoir positioned between the two lever members 11 and 12 in the area surrounding the rivet 13 where the lever members 11 and 12 are disposed to contact. This area is known as the pivot area. Although I have illustrated the oil reservoir as being of a circular nature concentric about the rivet 13, it is within the scope of this invention to provide oil reservoirs in the form of bars or other forms.

Generally the oil reservoir can be spaced from the rivet member or be in contact with the rivet member, and may be positioned in a recess on only one of the lever members, or may be positioned in a recess formed by both of the lever members, or any combination of the conditions cited. With reference to the figures from 2 to 7, I have illustrated a few of the possible variations which are within the scope of the invention, although numerous changes may be made therein without departing from the spirit and scope of the invention as defined in the claims.

Figure 2:
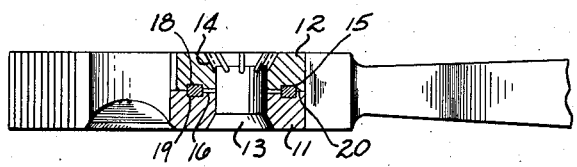

The Figure 2, for example, illustrates a porous metal ring oil reservoir positioned in the groove 18 of one of the lever members, and in the groove 19 of the other lever member. The two grooves registering to form a cavity to hold the reservoir. A clearance 16 is provided between the lever members in the pivoting area from the oil reservoir to the rivet 13. The peripheral portion of the pivot area is indicated by the reference character 20 and is located in the pivoting area opposite the oil reservoir from the side of the rivet 13. I find this desirable as it then throws all pressure between the two halves of the tool to the peripheral portion 20. This gives a better alignment of the plier tool and a long wearing tool. This provision is old in the art, and provides a longer life for this type of pivot, but I find that the value of this type of pivotal joint is greatly enhanced by the provision of my new improved oil reservoir to supply both the peripheral area 20 and the bearing surface between the lever 11 and the pivot 13 with a lubricant at the place where it is most needed.

Figure 3:
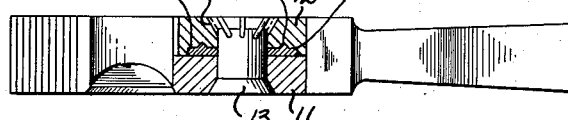
Figure 4:
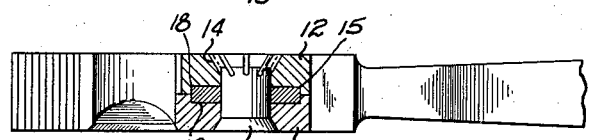
Figure 5:
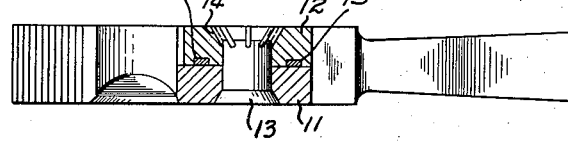

The Figure 3 illustrates a type of oil reservoir in contact with the pivot 13 and employing an interlocking surface or series of interlocking surfaces, between the porous metal ring oil reservoir and the one lever of the tool. This provision stabilizes the oil reservoir and keeps it in one position within the pivoting area.

Figure 6:
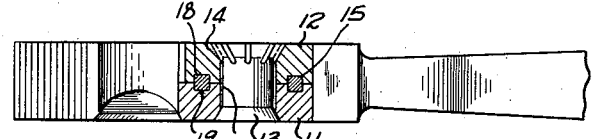
Figure 7:
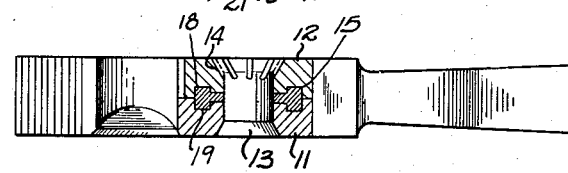

The Figures 6 and 7 illustrate a new and useful oil reservoir-bearing member which serves to both guide and lubricate the two lever halves. The Figure 6 shows the pivot 13 as having side walls 21 definitely spaced from the side of the rivet holes of the two lever members. This provision assures the exact alignment of the recesses provided for the oil reservoir 15, but is not entirely necessary because of the small amount of clearance that is normally present. It will be noted, with reference to the Figure 7, that the oil reservoir 15 is in physical contact with the rivet 13, and thereby provides a direct oiling action to the rivet 13.

The type of oil reservoir illustrated in Figure 1 and the Figure 7 also provides an additional function in that the porous metal ring oil reservoir 15 serves as a barrier to the entrance of dirt and grit. However, the particular type of oil reservoir chosen will be determined by the need and the use to which it is to be put.

Although my improved oil reservoir 15 may be used with tools employing rivets or with tools employing screw riveting means, particular utility exists when the reservoir is to be used with the fixed type of rivet, as illustrated in the Figure 1. To provide an oil reservoir in this type of tool, a groove or grooves are provided to form a recess for the reservoir. The reservoir is then slipped into place, the two levers placed together in their normal operating position, and a rivet inserted and peened into place and thus a unit construction is complete which is not easily dismantled. The lever members 11 and 12 are normally in a soft, or non-heat treated condition at this stage of assembly, and of course, the rivet must be in a soft condition in order to peen it in place. Therefore, the assembled device is heated to a suitable temperature and then plunged into a bath of oil to harden the metal of which the parts are made. It will readily be understood, therefore, that a cloth or fibrous pad would be of no use in this type of assembly, because it would be destroyed in the heat treating described.

At the same time that the metal of the assembly is being hardened by the described heat treating, the reservoir is being filled with lubrication oil. This reservoir 15 must be of a porous nature, and is best made by the methods of powder metallurgy. A volatile or combustible filler is used in the material when the reservoir 15 is formed, and this material either burns out during the described heat treating, or can be burned previous to the time it is inserted in the tool. As before stated, the reservoir 15 is filled during the heating process, by expanding the gases within the described pores of the reservoir during heating, and contracting these gases in the quenching oil bath. This quenching cooling contracts the gases and provides a low pressure area to draw the oils deep into the pores of the reservoir. Thereafter, this oil is brought out only by the slow process of capillary action.

These porous metal reservoirs can also be filled by independent heat action, or by placing them into an oil bath contained in a highly evacuated or low pressure area vessel, thereby sucking the gases out of the pores, after which the pressure is brought up to normal or higher in order to force the oil deep into the pores of the reservoir.

In summary, my invention provides an oil reservoir of great durability and desirable characteristics. A tool equipped with my improved reservoir will successfully withstand dropping from a high place, such as a lineman dropping a tool while working on a pole, or the shock produced by misusing the tool as a hammer, without driving the oil all out of the reservoir. The oil disperses only by capillary action. Further, if the tool were to fall into water or mud, or be exposed to weather conditions, the oil reservoir will successfully exclude water and air from the pores and prevent deterioration of the contained oil.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. In a joint between two members secured together by pivot means and having contacting bearing surfaces between the members, at least one of said contacting bearing surfaces having a recess therein defined by solid enclosing walls, an oil reservoir for said joint comprising a metal member having pores positioned in said recess and capable of holding lubricant by capillary attraction, said metal member having the pores thereof filled with oil, said recess and oil filled metal member therein constituting an improved oil reservoir for the joint, said solid enclosing walls directing the oil from the metal member to the bearing surfaces between the members.

2. In a joint between two members secured together by pivot means and having contacting bearing surfaces between the members, said contacting bearing surfaces having registering recesses concentric about the pivot means and constituting a bearing guide, said recesses being defined by solid enclosing walls, an oil reservoir for said joint comprising a metal member having pores positioned in said guide to serve as a bearing guide member between said pivoted members and capable of holding lubricant by capillary attraction, said metal member having the pores thereof filled with oil, said recess and oil filled metal member therein constituting an improved oil reservoir for the joint, said solid enclosing walls directing the oil from the metal member to the bearing surfaces between the members.

3. In a joint between two members secured together by pivot means and having contacting bearing surfaces between the members, at least one of said contacting bearing surfaces having a recess therein defined by solid enclosing walls, an oil reservoir for said joint comprising a metal member having pores positioned in said recess and capable of holding lubricant by capillary attraction, said metal member and the enclosing walls of the recess having interengaging locking means serving to stabilize the metal member in the recess, said metal member having the pores thereof filled with oil, said recess and oil filled metal member therein constituting an improved oil reservoir for the joint, said solid enclosing walls directing the oil from the metal member to the bearing surfaces between the members.

4. The method of producing an improved device having relatively actuatable parts pivotally connected at a pivot point, and having bearing surfaces between said part in the area of said pivot point, comprising the steps of providing a recess on the bearing surface of at least one of the said actuatable parts, providing a metallic piece having pores extending throughout the entire body thereof capable of holding lubricant by capillary attraction, placing the metallic piece in said recess, thereafter assembling said parts and riveting same together with the rivet comprising said pivot point, thereafter heating said assembled device including said porous metallic piece and rivet to cause gases contained in the pores of the metallic piece to expand and drive off a portion of the gases, and thereafter quenching said device in oil, said quenching action cooling said gases and causing them to contract and create a low pressure area to draw the quenching oil deep into the pores, whereafter the oil will feed from the pores by capillary action to lubricate the said bearing surfaces.

WILLIAM A. BARNES.

REFERENCES CITED

The following references are of record in the file of this patent:

UNITED STATES PATENTS

| Number | Name | Date |
|---|---|---|
| 766,506 | Lapp | Aug. 2, 1904 |
| 832,288 | Benney | Oct. 2, 1906 |
| 1,642,347 | Williams et al. | Sept. 13, 1927 |
| 1,648,722 | Claus | Nov. 8, 1927 |
| 1,783,853 | Miriello | Dec. 2, 1930 |
| 1,886,271 | Hoke et al. | Nov. 1, 1932 |
| 1,886,272 | Thomson | Nov. 1, 1932 |
| 1,912,101 | Short | May 30, 1933 |
| 1,930,067 | Tibbetts | Oct. 10, 1933 |
| 1,939,444 | Geyer | Dec. 12, 1933 |
| 1,943,631 | Skillman | Jan. 16, 1934 |
| 2,135,022 | Anderson | Nov. 1, 1938 |
| 2,169,580 | Conway | Aug. 15, 1939 |
| 2,190,217 | Patch | Feb. 13, 1940 |

FOREIGN PATENTS

| Number | Country | Date |
|---|---|---|
| 60,679 | Austria | Apr. 15, 1913 |